(12) United States Patent
Pitwon et al.

(10) Patent No.: US 8,861,975 B2
(45) Date of Patent: Oct. 14, 2014

(54) INTERCONNECT FOR A DATA STORAGE SYSTEM

(75) Inventors: Richard Charles Alexander Pitwon, Fareham (GB); Kenneth McPherson Hopkins, Chichester (GB)

(73) Assignee: Xyratex Technology Limited, Havant (GB)

( * ) Notice: Subject to any disclaimer, the term of this patent is extended or adjusted under 35 U.S.C. 154(b) by 687 days.

(21) Appl. No.: 13/035,523

(22) Filed: Feb. 25, 2011

(65) Prior Publication Data

US 2011/0222861 A1 Sep. 15, 2011

Related U.S. Application Data

(60) Provisional application No. 61/313,325, filed on Mar. 12, 2010.

(30) Foreign Application Priority Data

Mar. 12, 2010 (GB) .................................. 1004140.8

(51) Int. Cl.
*H04B 10/80* (2013.01)
*G02B 6/42* (2006.01)
*G02B 6/43* (2006.01)
*G02B 6/38* (2006.01)

(52) U.S. Cl.
CPC ............ *G02B 6/4214* (2013.01); *H04B 10/808* (2013.01); *H04B 10/801* (2013.01); *G02B 6/3885* (2013.01); *G02B 6/4249* (2013.01); *G02B 6/4277* (2013.01); *G02B 6/4293* (2013.01); *G02B 6/43* (2013.01)
USPC .............................................. 398/164; 33/12

(58) Field of Classification Search
CPC ............................ H04B 10/801; H04B 10/808
USPC .......................... 398/115–117, 135–139, 164
See application file for complete search history.

(56) References Cited

U.S. PATENT DOCUMENTS

| 5,883,998 | A  | 3/1999 | Stevens et al. |
| 5,896,473 | A  | 4/1999 | Kaspari |
| 6,233,376 | B1 | 5/2001 | Updegrove |
| 6,588,943 | B1 | 7/2003 | Howard |

(Continued)

FOREIGN PATENT DOCUMENTS

| WO | 03/089961 | 10/2003 |
| WO | 2006/129069 | 12/2006 |
| WO | 2007/117903 | 10/2007 |
| WO | 2009/136925 | 11/2009 |
| WO | 2010/050985 | 5/2010 |
| WO | 2010126463 | * 11/2010 |

OTHER PUBLICATIONS

United Kingdom Search Report dated Jul. 6, 2011 in corresponding Great Britain Patent Application No. GB1104129.0.

(Continued)

*Primary Examiner* — Leslie Pascal
(74) *Attorney, Agent, or Firm* — Pillsbury Winthrop Shaw Pittman LLP

(57) ABSTRACT

The invention provides an interconnect for a data storage system, to enable optical communication between a data storage device and a backplane to which the data storage device is in use to be connected, wherein the interconnect includes an electrical power connection for providing power to a said data storage device; and, an optical engine for generating and receiving optical signals for transmission of data between the data storage device and the backplane.

19 Claims, 12 Drawing Sheets

(56) References Cited

U.S. PATENT DOCUMENTS

| | | | |
|---|---|---|---|
| 7,490,993 B2 | 2/2009 | Pitwon | |
| 2005/0207107 A1* | 9/2005 | Reasoner et al. | 361/685 |
| 2007/0201008 A1 | 8/2007 | Lin | |
| 2008/0199132 A1 | 8/2008 | Pitwon | |
| 2009/0142022 A1 | 6/2009 | Chuang | |
| 2012/0033978 A1* | 2/2012 | Morris et al. | 398/115 |

OTHER PUBLICATIONS

United Kingdom Intellectual Property Office Search Report dated Dec. 14, 2011 in corresponding Great Britain Patent Application No. GB1104129.0.

Great Britain Search Report dated Jul. 12, 2010 in related Great Britain Patent Application No. GB1004140.8.

* cited by examiner

INTERCONNECT FOR A DATA STORAGE SYSTEM

CROSS REFERENCE TO RELATED APPLICATIONS

This application claims priority to U.S. Provisional Application No. 61/313,325, filed Mar. 12, 2010 and Great Britain Patent Application No. GB1004140.8, filed Mar. 12, 2010. The content of these applications is incorporated herein by reference in their entirety.

The present invention relates to an interconnect for a data storage system.

As used herein, the term "optical backplane" means a backplane for receiving one or more user circuits, in which the backplane includes optical channels as well as or instead of electrical channels. In the present case, the user circuits are likely to be data storage devices such as, but not limited to, hard disk drives. The term "backplane" is used to mean any form of board or structure to which one or more data storage user circuits may be connected. The term is used broadly and is intended to include a motherboard, midplane or backplane that might be used in a high density data storage system.

Pluggable optical backplanes are known. An example of such a system is as described in our co-pending patent application number WO-A-2006/129069, the entire contents of which are hereby incorporated by reference. In this application, there is disclosed an optical connector for connecting a line card or user circuit, sometimes referred to as a "daughter card", to an optical backplane. The connector comprises an active or passive photonic interface through which optical signals may be transmitted and received between a line card and an optical backplane. Alignment means are provided for ensuring alignment between the optical interface on the connector (attached to the line card) and the optical interface on the backplane with which the line card mate. Such an arrangement provides a very useful and convenient optical transceiver and connector module which supports repeatable docking of conventional line cards or user circuits (once a connector is arranged thereon) to an optical backplane.

US-A-2009/014202 discloses an eSATA and an optical fibre patch cord. A connector is provided including a slot for an eSATA transmitting line. A second slot is provided for receiving the plug of an optical fibre patch cord.

U.S. Pat. No. 5,883,998 discloses a connector having both optical and electrical ports.

WO-A-2007/117903 discloses a connector for an electrical backplane and an electrical backplane which includes communication interfaces to couple interfaces on the electrical and optical backplanes respectively. A chassis is provided that includes both an electrical backplane and an optical backplane.

WO-A-2010/050985 discloses the use of an optical engine on a computing board.

US-A-2007/0201008 discloses the use of an optical engine on a digital light processing projection device.

U.S. Pat. No. 5,896,473 discloses an optical backplane.

Other connectors for optically connecting a user circuit to an optical backplane are also known, such as the systems described in U.S. Pat. No. 6,588,943 and U.S. Pat. No. 7,490,993, the entire contents of both of which are hereby incorporated by reference. A system is disclosed in U.S. Pat. No. 7,490,993 in which an adaptor for an optical printed circuit board is provided, the adaptor comprising a socket for receiving a daughter card for connecting to an optical printed circuit board and a connector for engagement with the optical printed circuit board arranged such that when the connector engages with the optical printed circuit board an optical connection is established between the optical printed circuit board and the adaptor.

The system of U.S. Pat. No. 7,490,993 works well. However, a further simplified system is desired which enables both electrical and optical communication between a hard disk drive and an electro-optical midplane. Indeed, a system is required which is specifically targeted at providing low-cost optical connectivity between hard disk drives and electro-optical midplane in a storage system.

According to a first aspect of the present invention, there is provided an active interconnect for a data storage system, to enable optical communication between a data storage device and a backplane to which the data storage device is in use to be connected, wherein the interconnect includes an electrical power connection for providing power to a said data storage device; and, an optical engine for generating and/or receiving, in use, optical signals for transmission of data between the optical engine and the backplane, wherein in use the optical engine is arranged to receive and/or generate electrical data signals for transmission of data between the optical engine and the data storage device.

An active interconnect for a data storage system is provided including an optical engine arranged to communicate electrically with a hard disk drive to which in use it is connected and optically with an optical PCB forming part of a backplane to which it is, in use, connected. A simple and efficient means is provided for enabling a conventional electrical disk drive to be connected to an optical backplane. Whilst in various of the published documents referred to above there is disclosed the use of optical connections within a backplane, there is no disclosure or suggestion of the use of an interconnect that is active and includes an optical engine that enables simple and reliable optical communication between a disk drive and an optical backplane.

Furthermore, the use of an optical engine in this context has particular advantages. One such advantage is that the provision of an entirely optically passive backplane is enabled. Conventionally, in an optical backplane which included active optical components for communication with a storage device, if faults developed, significant work would be required on the backplane itself to address them. In the present interconnect, this is avoided in that if faults do develop within the optical system these can be easily fixed without requiring significant work on the backplane itself. In other words, the electro-optical backplane (or midplane) of the storage system can be made entirely optically passive.

According to a second aspect of the present invention, there is provided an optical interconnect for a data storage device, the interconnect comprising a directly pluggable optical connector to enable optical communication between a data storage device and a backplane to which the data storage device is in use to be connected, wherein the optical interconnect includes an optical engine for generating and receiving optical signals for transmission between the user circuit and the backplane.

An optical interconnect is provided that includes an optical engine. The use of an optical engine in an optical interconnect provides an extremely efficient and convenient and inexpensive means by which a simple pluggable optical connector can be provided. As will be explained below, most optical engines can be controlled via an appropriate low to speed bus interface. It would be expected that the motherboard supports this electronic bus interface and that dedicated electrical contacts be presented on the electronic interface to the storage device to allow this communication.

An interconnect for a data storage device is provided to enable optical communication between a data storage device and a backplane to which the data storage device is in use to be connected, wherein the interconnect includes an electrical power connection for providing power to a said data storage device, an electronic signal connection for providing low speed electronic signals and static control signals to a said data storage device; and, an optical engine for generating and receiving optical signals for transmission of data between the data storage device and the backplane.

In one embodiment, the interconnect is provided as a separate unit for connection to a data storage device or an optical backplane. Thus, the interconnect can be coupled to a data storage device and/or to an optical backplane as required to enable communication therebetween. In one embodiment, the optical interconnect may be provided as an integrated part of a data storage device.

In one embodiment, the interconnect is a standard electrical SAS/SATA interconnect modified to include high speed optical data connections.

In one embodiment, the footprint of the modified interconnect is substantially the same as the footprint of the standard electrical SAS/SATA interconnect. This means that the interconnect (and a corresponding backplane) can be used in conventionally sized and arranged storage devices. In one embodiment, the modification includes removal from the standard electrical SAS/SATA interconnect the high speed bidirectional data channels and replacing them with the optical engine.

In one embodiment, the optical engine is provided in parallel with and in a different physical plane from the electrical power connection.

In one embodiment, in addition to the optical engine, high speed electrical bidirectional data channels are included too.

These last two features provide a degree of redundancy built into the interconnect in that data transfer between a data storage device and the backplane can occur either by the known electrical route or alternatively (or additionally) by the optical route too.

In one embodiment, the optical engine is provided on a flexible support layer and a rigid brace is provided to hold the optical engine and the flexible support layer in a fixed orientation with respect to the physical plane of the electrical power connection. Thus the device can be easy to manufacture and yet still be robust and easy to use by an end user. In particular, the provision of a parallel rigid optical connection between the storage device and the backplane enables an easy to use pluggable redundant data transfer connection.

According to a third aspect of the present invention, there is provided a data storage interconnect for arrangement on an optical backplane for connection of a data storage device with the backplane, the interconnect comprising: a socket fixedly mounted to the backplane and having an opening for receiving a further interconnect associated with a data storage device, the socket comprising a first region for providing electrical connection between the further interconnect and the optical backplane, and a second region comprising an opening to provide access to one or more optical waveguides on the optical backplane to provide high speed optical data connection between an optical engine on the further interconnect and the optical backplane.

An interconnect is provided that includes a simple pluggable socket. Both optical and electrical data transfer between a storage device such as a hard disk drive and an optical backplane is enabled.

In one embodiment, the socket is permanently mounted to the optical backplane thus forming a permanent fixture for safe and repeatable plugging and unplugging of a user circuit to the backplane.

In an embodiment, the footprint of the interconnect is substantially the same as the footprint of a standard electrical SAS/SATA interconnect. This means that the interconnect (and a corresponding backplane) can be used in conventionally sized and arranged storage devices.

In an embodiment, the second region comprises an interface component for engagement with an optical engine provided on the further interconnect. The interface component may be a precision moulded component, e.g. a precision moulded plastics component, arranged to house a lens interface such as a GRIN lens block. This can serve the purpose of providing an interface between the waveguides on the optical backplane and the optical engine.

In one embodiment, the footprint of the first region is substantially the same as the footprint of a standard electrical SAS/SATA interconnect and the second region is provided adjacent to the first region to enable parallel optical communication with the backplane. This enables a degree of redundancy to be built into the interconnect in that data transfer between a storage device and the backplane can occur either by the known electrical route or alternatively (or additionally) by the optical route too. In addition, since the first region is the same as a standard electrical SAS/SATA interconnect, the socket can simply receive a conventional electrical storage device interconnect instead of an optical interconnect.

According to a fourth aspect of the present invention, there is provided an optical backplane for use with an interconnect according to the first or second aspects of the present invention, the optical backplane comprising one or more optical waveguides for carrying optical signals; an electrical power connection for connection to the electrical power connection of the interconnect of the first or second aspects of the present invention; and an optical interface connection region for engagement with the optical engine of the interconnect of the first or second aspects of the present invention.

In one embodiment, the electrical power connection and the optical interface connection region in combination have the same as the footprint of a standard electrical SAS/SATA interconnect.

In another embodiment, the electrical power connection has a footprint the same as the footprint of a standard electrical SAS/SATA interconnect and in which the optical interface connection region is provided adjacent to the electrical power connection.

Embodiments of the present invention will now be described in detail with reference to the accompanying drawings, in which.

Figure 1:
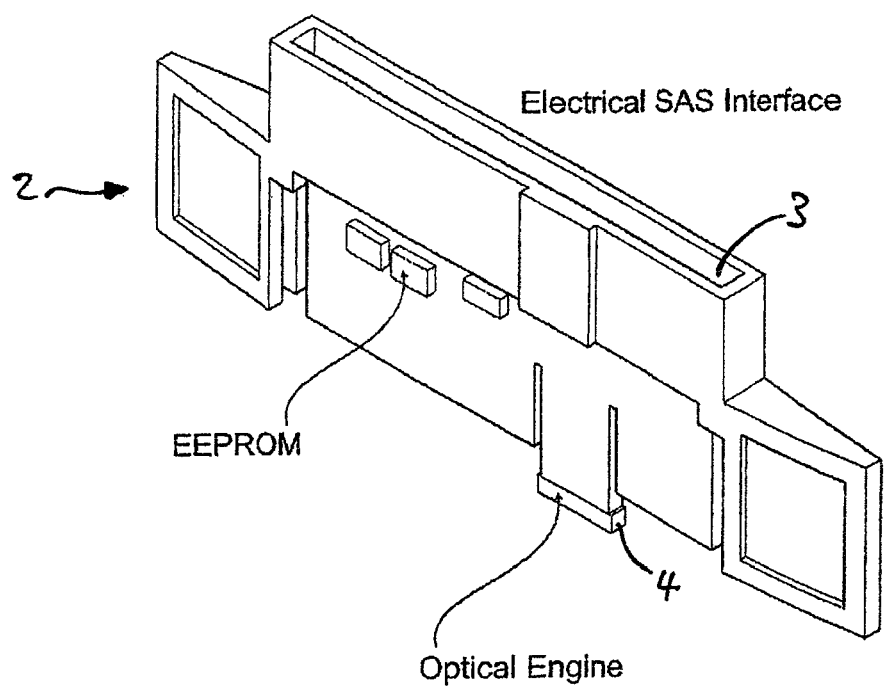
FIG. 1 is a schematic representation of an intermediary interface including an optical connector.

FIG. 1 is a perspective view from above of an optical interconnect. In this example the interconnect is a low cost pluggable intermediary optical connection. The connector is configured for use between a data storage device (not shown in FIG. 1) such as a hard disk drive (HDD), a solid state device (SSD), an optical storage device such as a CD, DVD, HDDVD, Bluray, a holographic storage device or the emerging optical USB standard to an electro-optical printed circuit board in a data storage system, computer or media player. In the specific example shown, the interconnect is suitable for a HDD or solid state drive. A variant of this could be used with the other data storage devices or interfaces as listed.

Thus, the connector of FIG. 1 is suitable for use in any systems in which a storage device or an interface card plugs into a motherboard. In a preferred example, the connector is a hard disk drive connector including an active optical connector.

It is preferred that the interconnect includes two duplex optical data connections per hard disk drive in accordance with the Serial Attached SCSI (SAS) standard. In other words, the interconnect can replace the conventional electrical connection between a disk drive and a motherboard in that the conventional electrical high speed data links are replaced by duplex optical data connections. An optical engine, as will be described in detail below, is used to generate and receive optical data signals for transmission between the storage device and the motherboard or circuit to which it is connected.

As mentioned above, U.S. Pat. No. 7,490,993 discloses an adaptor for an optical printed circuit board, the adaptor comprising a socket for receiving a daughter card such as a hard disk drive, for connection to an optical printed circuit board. As discussed in this patent, the entire contents of which are hereby incorporated by reference, an actuator is provided which must be actuated to enable a connection to be made or broken between a storage device and the optical PCB to which it is to be connected or disconnected. In contrast, in the present system, the device is simply pluggable in that only a single movement is required by the user to connect a storage device to an optical PCB.

The present device includes an optical engine provided as part of the interconnect. An optical engine provides an extremely efficient and convenient means by which a simple pluggable optical connector can be provided. As will be explained below, most optical engines can be controlled via an appropriate low speed bus interface. It would be expected that the motherboard supports this electronic bus interface and that dedicated electrical contacts be presented on the electronic interface to the storage device to allow this communication. Alternatively, optical engines with non-volatile memory could be pre-programmed by the manufacturer to run in a default configuration without real-time control access by the consumer.

Figure 2:
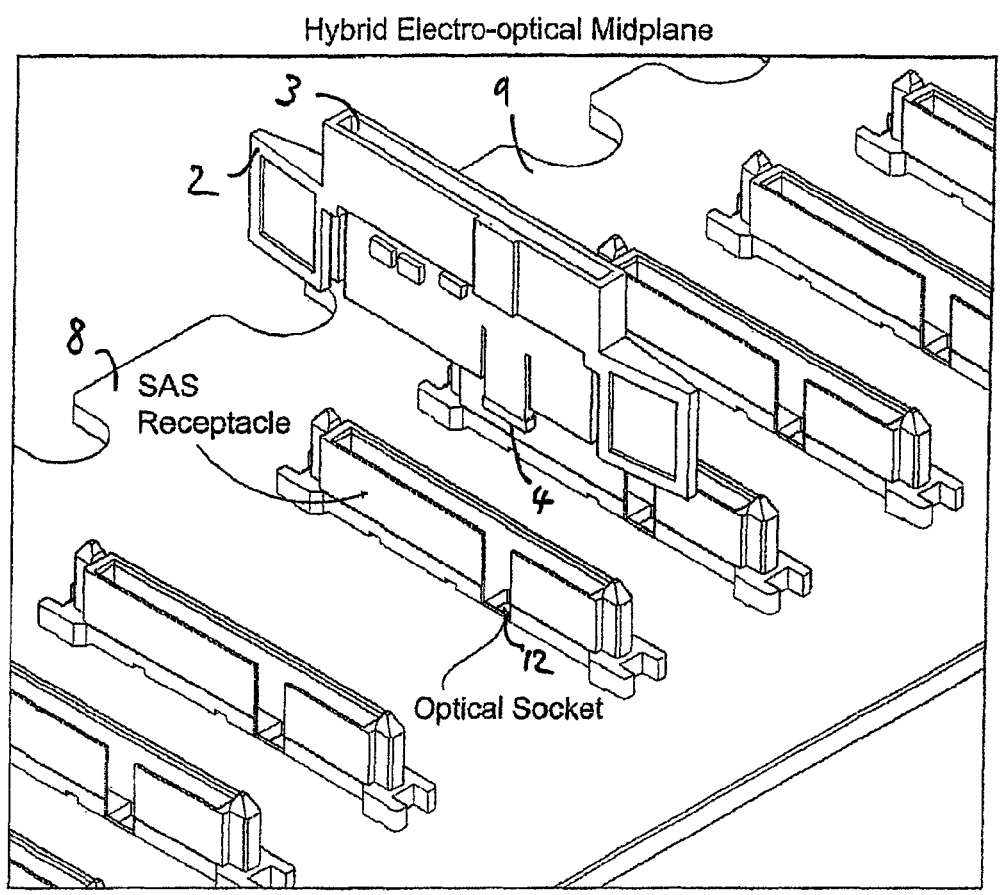
FIG. 2 is a schematic representation of an optical connector and an optical backplane receptacle.

The connector of FIG. 1 is typically provided either integrated into a hard disk drive or arranged for connection thereto so as to enable the interconnect and the hard disk drive in combination to be plugged into an optical backplane. FIG. 2 shows a schematic representation of the backplane arranged to receive the interconnect of FIG. 1. A hard disk drive is not shown but it will be appreciated that it could be provided either as a separate component or integrated with the interconnect.

The interconnect of FIG. 1 includes an optical engine 4. The optical engine is an example of a small multi-chip module. The optical engine or module provides a parallel optical transceiver and optical interface onto the edge of the hard disk drive PCB (or other storage device) or alternatively onto an interface or dongle such as that shown in FIG. 1.

This principle applies to any storage device used in a high density data storage system in which one or more, storage devices are arranged to connect to a motherboard, midplane or backplane. For example, this could be used in an interface between a CD ROM, DVD ROM, HDDVD ROM or alternative data storage device module to the motherboard of a computer whereby the motherboard is an electro-optical PCB.

A typical electronic SAS interface will include contacts for two high speed bi-directional channels and power. The connector of FIG. 1 replaces the two high speed bi-directional metal contacts on the SAS interface with a parallel optical engine, arranged to provide two high speed bi-directional optical links. Thus, a "two plus two" optical engine is provided i.e. a multi-chip module (MCM) to convert two electronic transmit lines to two optical transmit lines such as laser lines, and to convert two optical receive lines to two electronic receive lines. As will be explained below, the optical engine is small enough such that the lateral space, i.e. the length on the SAS interface, it occupies will not exceed that of the two bi-directional copper contacts used in a conventional SAS interface. Thus, the same remaining electronic contacts on the SAS interface can be used to provide power. A SATA interface will require only one high speed bidirectional channel. Clearly the precise configuration in terms of numbers of channels and the like can be provided in accordance with standard protocol needs.

FIG. 2 shows a schematic representation of the backplane 8 into which a hard disk drive (not shown) may be plugged using an optical interface. The optical connector includes an optical engine 4. The SAS receptacle 10 provided on the optical backplane 9 is modified so as to include an optical socket 12.

When the connector 2 is arranged connected to a hard disk drive, i.e. having a hard disk drive plugged into its socket 3 the hard disk drive can simply be plugged into the backplane 8.

Figure 3:
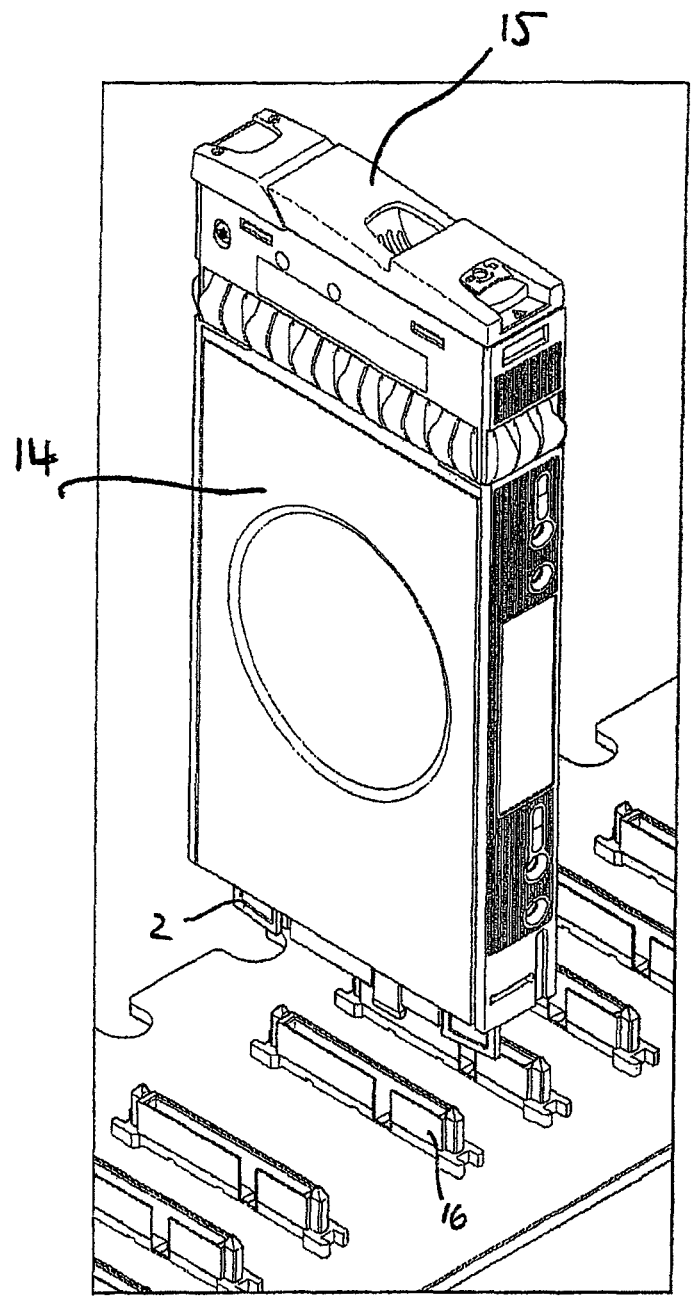
FIG. 3 is a schematic representation of a disk drive carrier with an optical connector module for plugging into a data storage midplane.

FIG. 3 shows a schematic representation of an interconnect 2 such as that shown in FIGS. 1 and 2 arranged connected to the housing of or carrier 14 for a hard disk drive. Thus, a simple and easy way to operate the pluggable interconnect is provided that enables direct reliable plugging of a data storage device such as a hard disk drive into a backplane. As can be seen, in the particular example of FIG. 3, the interconnect 2 forms an integrated part of the housing of or carrier for the data storage device. In this example, the carrier 14 has a handle/latch 15 which is usable to plug or unplug the drive carrier into or from the backplane.

Figure 4:
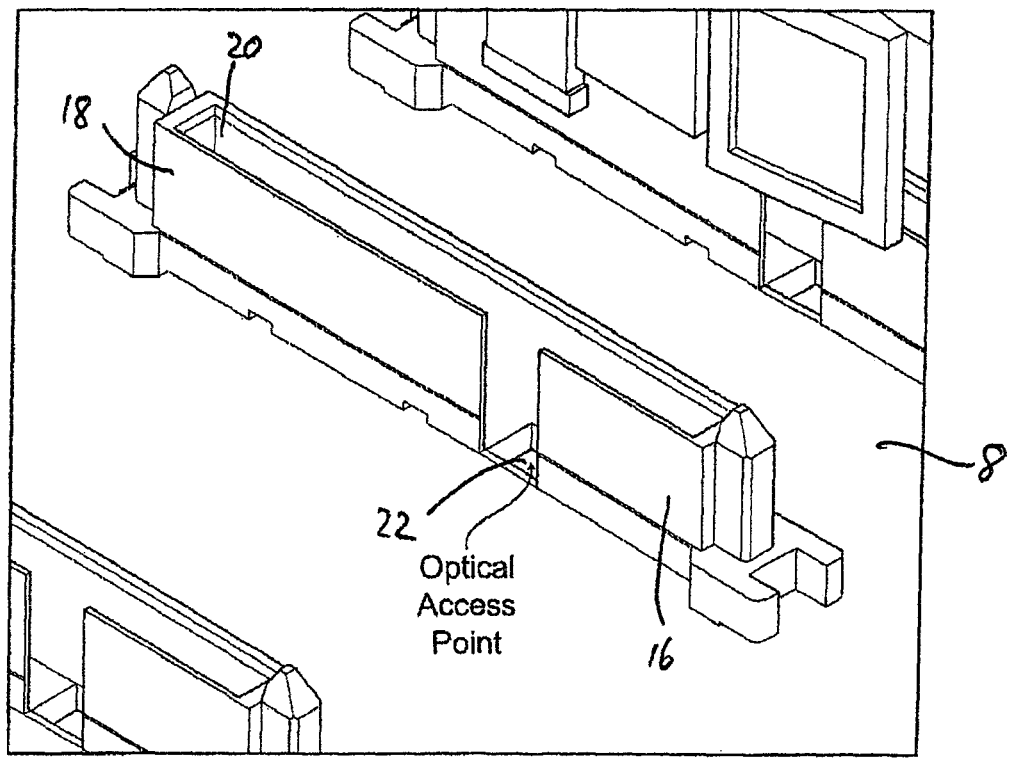
FIG. 4 is a schematic representation of a modified midplane receptacle.

FIG. 4 shows a schematic representation of the modified midplane or motherboard receptacle 16 for receiving an interconnect such as that shown in FIGS. 1 *and* 2. The receptacle 16 has a housing 18 with an opening 20 for receiving the interface from the interconnect 2.

The receptacle 16 has the section usually provided for high speed electronic data links removed so as to provide access by the optical engine to the optical waveguide layer embedded in the motherboard or backplane 8. In the example shown in FIG. 4, a recess 22 is provided on the backplane 8 so as to enable access to the optical waveguide layer (not shown) embedded in the motherboard or backplane 8. In general, a data storage device will connect to a motherboard or backplane using an interconnect appropriate to its interface standard. In the present case, the part of the interface devoted to high speed data channels is replaced by an optical engine to convert electrical signals from a data storage device into optical signals which are then relayed to optical waveguides embedded in the electro-optical motherboard via an optical receptacle. In reverse, the system works correspondingly, i.e. optical signals are received from the waveguides embedded in the electro-optical motherboard and converted to electrical signals for transmission to the data storage device 14.

The optical receptacle provided within the recess 22 will now be described in detail.

To convey optical signals to and from the storage device (from and to the electro-optical motherboard) the connector 10 is modified such that part of the electronic connector receptacle devoted to the high speed links is cleared for direct access to the optical receptacle while the rest of the electronic connector receptacle remains intact. Thus, the usual power or low speed signals to the storage device may be provided in addition to the high speed data transfer links. This arrangement allows a degree of coarse alignment of the optical interfaces on the interconnect and the backplane by the standard connection of the electronic contacts on the storage device to the electronic contacts on the unaltered part of the electronic connector receptacle. Thus, such coarse alignment may be achieved before the optical interface on the storage device, i.e. the optical interface on the optical engine, engages to the required higher alignment precision inherent to optical interfaces.

Figure 5:
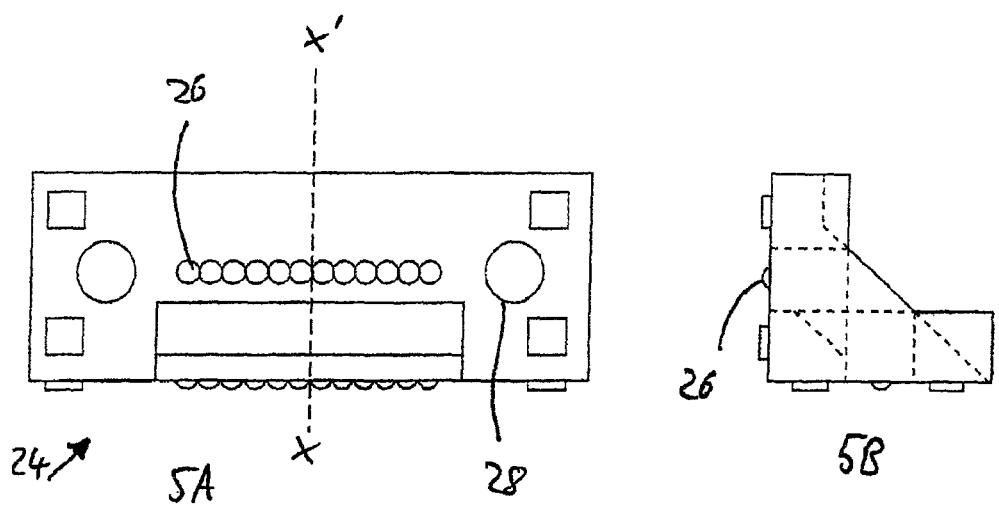
FIGS. 5 to 7 show schematic representations of the optical alignment mechanism for use in the connector of FIGS. 1 to 4.

In a preferred example, commercial right-angled micro lens arrays are arranged in a mount on the electro-optical motherboard such that it is aligned to the optical waveguide embedded in the electro-optical motherboard. This will allow "out-of-plane" signals, i.e. optical signals for propagation from the optical engine in a direction substantially perpendicular to the major plane of the optical engine, to be directed to and from the waveguides on the storage device. In one specific embodiment, right-angled lenses are provided by commercial lens manufacturers such as Omron. As described below, an example of such a system is shown in FIG. 5. These are a variant of the low-cost flat lens arrays such as plastic molded geometric lens arrays or Gradient Index lens arrays, which have been used on earlier optical connector inventions of the present applicant. Such flat lens variants can of course also be used in the present system.

Figure 6:
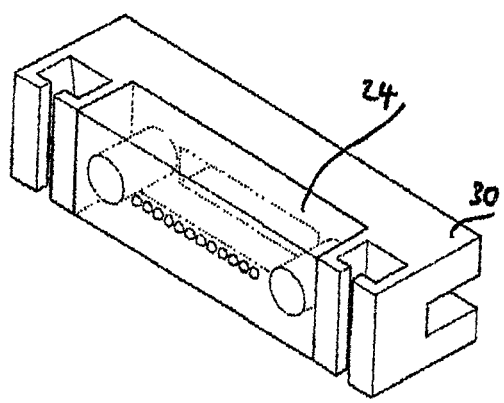
Figure 7:
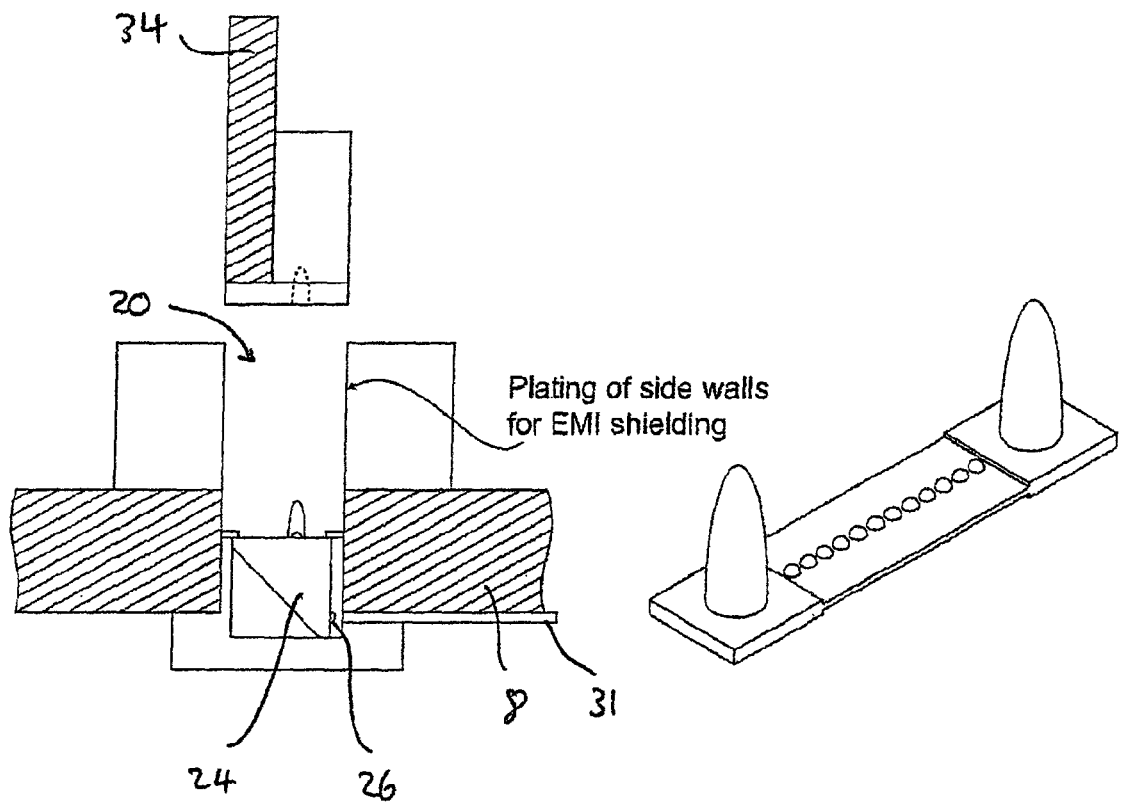

FIGS. 5 to 7 show schematic representations of the optical assembly that would typically be used in the interconnect 2. FIG. 5 shows a schematic representation of an example of a commercially available microlens array 24. FIG. 5A shows a head on view of the micro lens array in which each of the individual micro lenses 26 can be seen. Alignment slots 28 are provided which enable accurate alignment of the lenses 26 with the one or more waveguides 31 of the optical backplane (see FIG. 7). FIG. 5B is a vertical section, along the line XX', through the array 24. The specific example shown is the Omron P1L12A/P1L12C Micro Lens Array.

FIG. 6 is a schematic representation of a lens bracket 30 that would typically be provided within the opening 12 in the optical backplane 8. In this example, the lens bracket 30 is a precision moulded plastic component for accommodating the microlens array 24.

FIG. 7 shows a schematic representation of the microlens array 24 assembled in the backplane 8. The backplane 8 includes one or more embedded optical waveguides 31, which can be seen arranged in alignment with the lenses 26 of the lens array 24. The opening 20 of the SAS receptacle 10 is sized to receive an interconnect 2 including a PCB 34 that would include the optical engine (not shown in FIG. 7). Thus, upon direct insertion of the PCB 34 (as part of the interconnect 2) into the opening 20 of the receptacle 10 optical and electrical communication is established between the backplane 8 and a hard disk drive or other such storage device to which the interconnect 2 is engaged.

The lens holder 30 typically incorporates MT slots both to hold the lenses in position and to receive the male MT interface of the optical engine, to be described in greater detail below. This increases alignment accuracy. In addition, the lens holder 30 forms a brace which precludes the need for any adhesive to hold the lenses and lens holders together.

It is preferred that some form of plating 32 is provided on the inner surface of the opening 20. More preferably the lining is provided on all inner surfaces of the opening 20 so as to provide shielding from electromagnetic interference.

In another example, optical USB (USB3.0) may be provided. This is a standard proposed by Microsoft, Hewlett Packard and NEC, whereby a USB device uses a fibre-optic connector to convey optically higher data rates than would be available using conventional USB connectors. Another possible approach would be to use an optical engine on the contact edge of the USB itself or the interface card that the USB plugs into electronically. In the latter case, the optical engine would be arranged on the interface which connects to the computer motherboard. The motherboard in turn would be an electro-optical PCB.

In embodiments of the present invention, interconnect redundancy is provided. In other words, in preferred embodiments the interconnect accommodates both electronic (standard) data connectors and also optical data connectors. Thus, the interconnect has both electronic and optical traces or pathways to provide an additional layer of redundancy.

Figure 8:
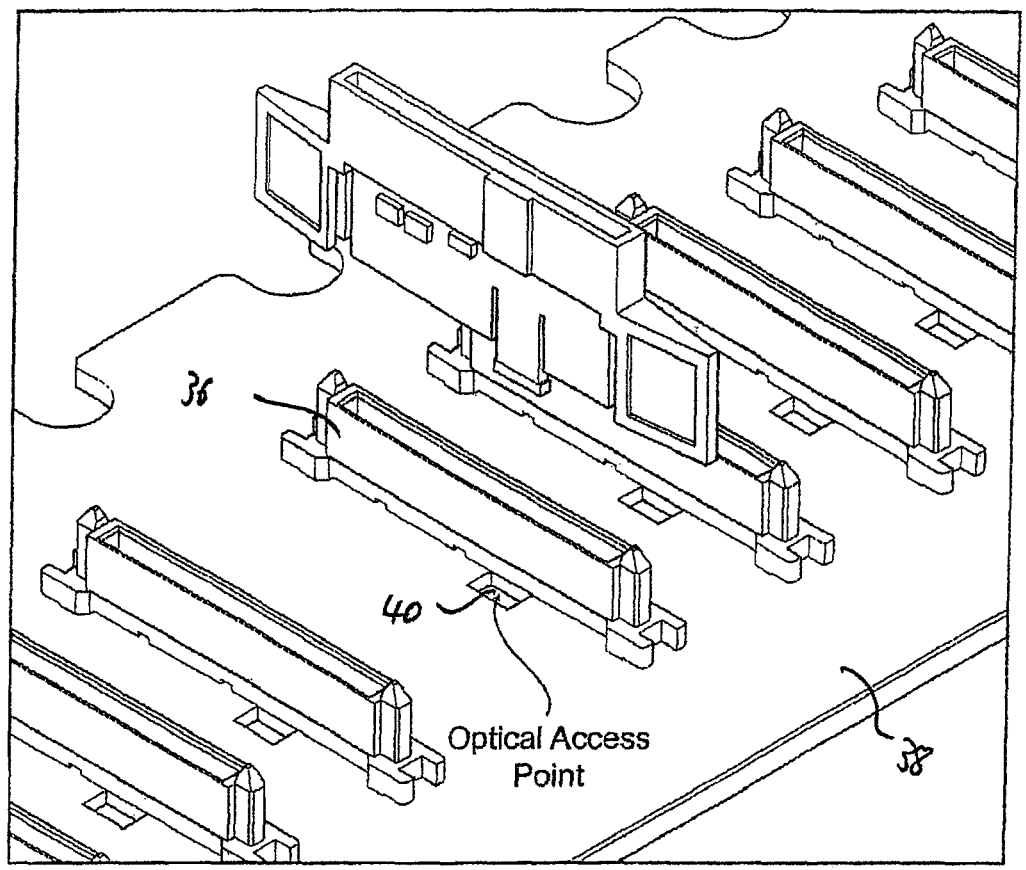
FIG. 8 is a schematic representation of an optical backplane receptacle having redundant electronic and optical connectors including an offset optical clearance slot.
Figure 9:
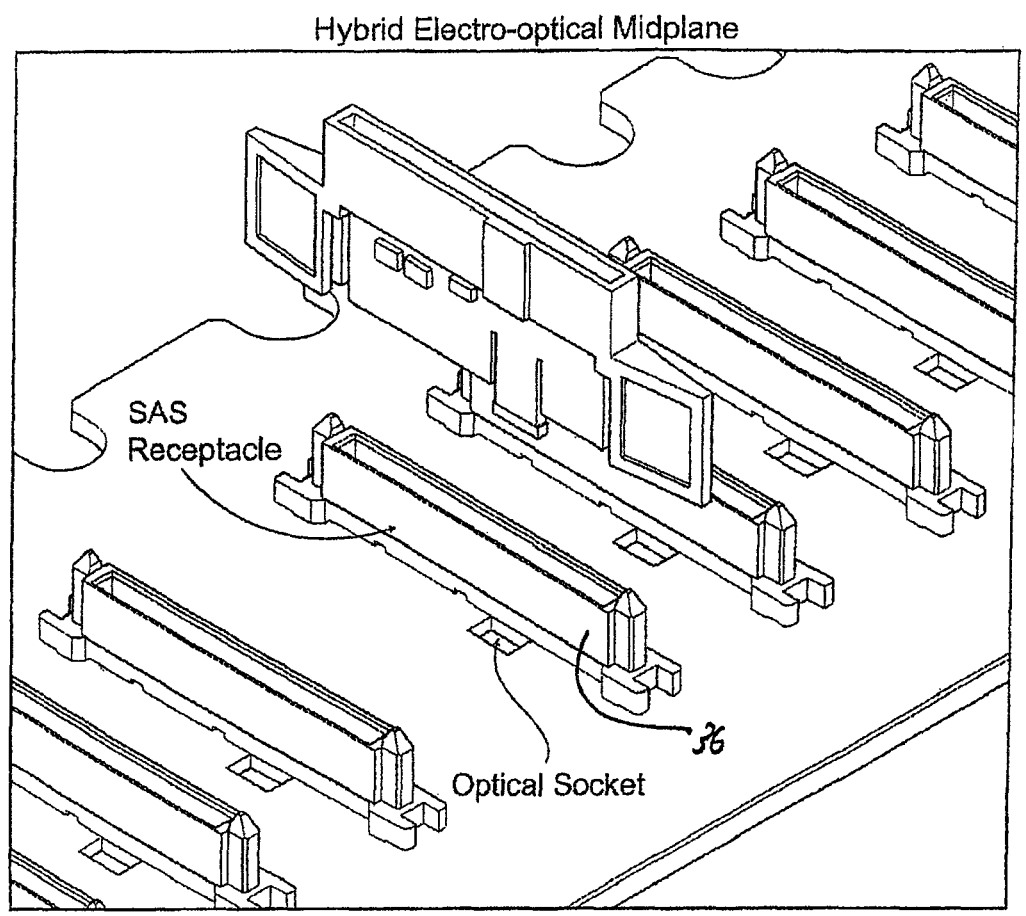
FIG. 9 is a schematic representation of an optical backplane receptacle with offset optical clearance.
Figure 10:
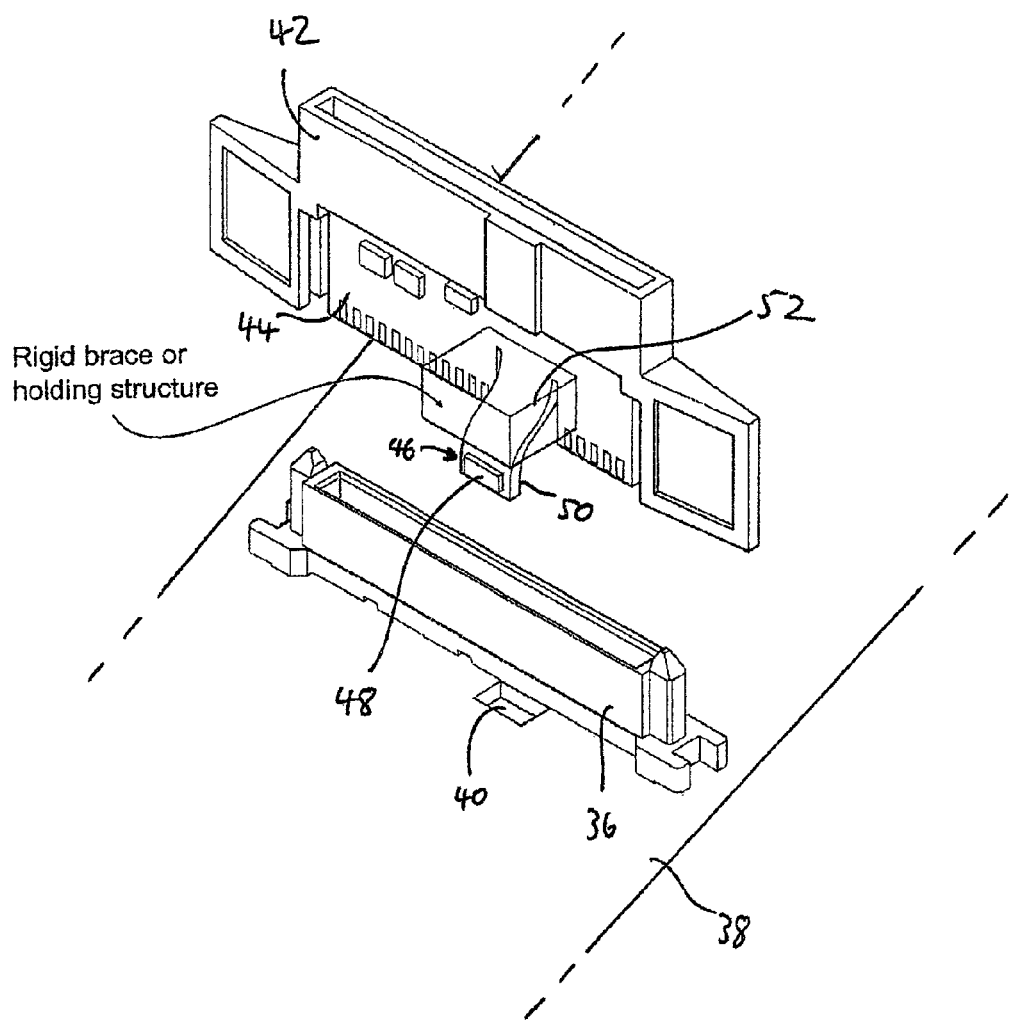
FIG. 10 is a schematic representation of an electro-optical hard disk drive interface for accommodating redundant electronic and electro-optical receptacles.

FIG. 10 shows a schematic representation of an interconnect 4 providing such redundancy. The interconnect includes a receptacle or housing 36 fixed to the electro-optical backplane 38. The housing 36 has a profile that is the same as a normal electronic receptacle, i.e. no cut-out as shown in the example of FIGS. 2 to 4. Rather, instead, an optical clearance slot 40 is provided in the electro-optical backplane 38 adjacent to the housing 36. Thus, a conventional electronic HDD interface can connect to the unaltered (all-electronic) SAS receptacle as it would on an all-electronic backplane. In addition, electro-optical interfaces on the interconnect are modified as compared to the examples described above with reference to FIGS. 1 to 4, such that the optical engine section of the interface would be shifted in a direction normal to the plane of the connecting PCB to engage with an optical clearance slot 40. The optical clearance slot 40 is adjacent to the unaltered SAS receptacle as shown in FIGS. 8 to 10. By providing independent electrical and optical connectivity to the backplane 38 redundancy is provided. In other words, the provision of parallel optical and electrical connectivity ensures that if one of the connectivities is faulty, i.e. one of the electrical and optical, communication with the backplane can continue using the other.

Figure 11:
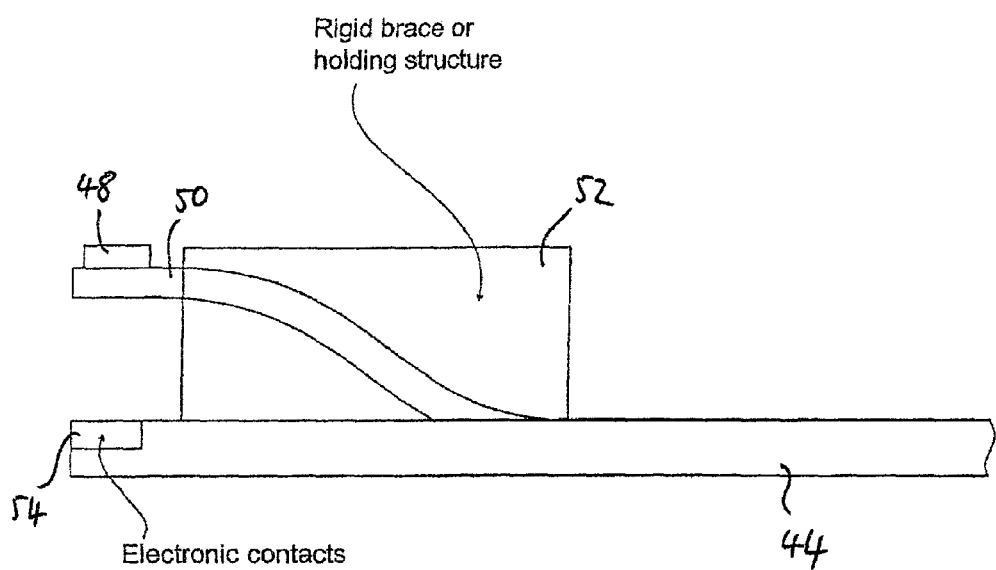
FIG. 11 is a schematic representation of a side view of an electro-optical hard disk drive interface for accommodating redundant electronic and electro-optical receptacles.

Referring to FIGS. 10 and 11, the interconnect comprises a housing 42 with a conventional electrical PCB interface 44 together with an optical interface 46. The optical interface 46 includes an optical engine 48 as described above.

The optical section of the HDD interface is provided on a flexi-rigid PCB support 50, such as flexible polyimide, which enables that part of the PCB be shifted normal to the plane of the PCB 44 on which the electrical interface is provided. A rigid brace or holding structure 52 is provided to maintain the shifted position, i.e. to ensure that the optical interface section 46 is maintained in the plane-shifted position relative to the plane of the electrical interface 44. This is not a dynamic pluggable system and the optical engine 48 is not arranged for movement relative to the plane of the connecting PCB during engagement. Rather, the rigid brace 52 serves to maintain the offset between the optical engine 48 and the plane of the connecting PCB 44. Accordingly, flexibility in the support is preferable as it enables easy and convenient configuration during manufacture but it is certainly not essential.

The housing 36 is suitable for receiving a conventional electrical SAS connector as well as a SAS connector including optical functionality as described herein with reference to any of FIGS. 8 to 11.

FIG. 11 shows a side view of the connector of FIG. 10. As can be seen, an optical engine 48 is provided at the distal end of the PCB 50 and is maintained in its configuration by the rigid brace or holding structure 52. Thus, the electrical contacts 54 of the conventional electrical PCB 44 can operate as normal, i.e. as a standard electrical SAS connector.

Figure 12:
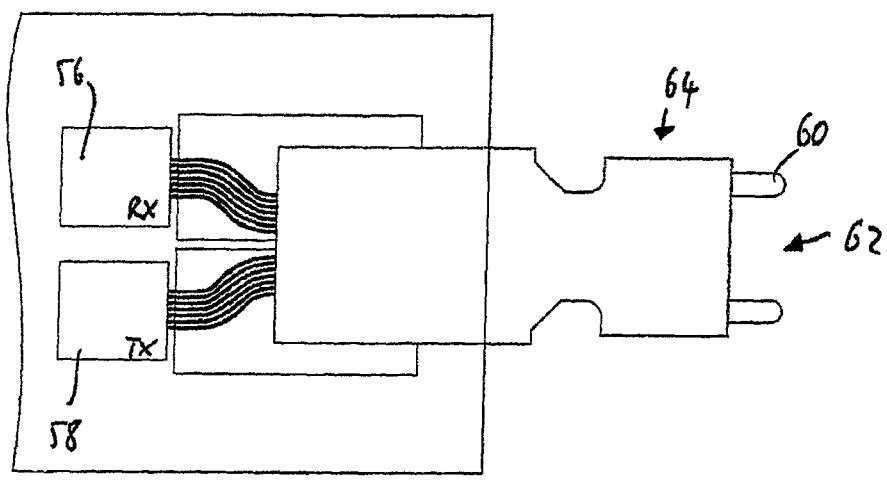
FIG. 12 is a schematic plan view of an example of an optical engine for use in the connector of FIGS. 1 to 11.

FIG. 12 is a schematic representation of an optical engine that might be used in the connector of any of FIGS. 1 to 11. The optical engine includes both receive and transmit components 56 and 58, respectively. The optical engine includes alignment projections 60 and an optical channel region 62 for the transmission and reception of optical signals. The connector region 64 might typically be an MT optical connector. Typically, the optical engine is small, requiring less than 100 square millimetres of space on the PCB. The thickness of the optical engine is typically less than 3 mm. An example of such an optical engine is the LightAble optical engines as provided by Reflex Photonics, LightPeak developed by Avago Technologies and Intel or Zarlink Optical Engine (ZOE) provided by Zarlink Semiconductor. Any suitable optical engine can be used.

A significant advantage of the present system is that the backplane itself is entirely optically passive. Thus, if there are any faults that develop with the optical system, these can be easily fixed without any significant work being required on the backplane itself. Thus, the connector provides a low-cost and reliable solution to support high speed embedded optical interconnects for data storage devices on electro-optical PCBs. In addition, a pluggable modular solution is provided which removes the need for fixed active devices in the high speed signal path on the electro-optical midplane/backplane of the storage system. The electro-optical midplane/backplane of the storage system can be made entirely optically passive. The deployment of an optical engine on a data storage device or the associated connector to implement an optical interface to an electro-optical motherboard, midplane or backplane provides a useful and convenient means by which optical interconnect may be embedded into a data storage array system. The conventional electronic connector is modified so as to provide an optical receptacle on the electro-optical motherboard. The use of this system also provides redundant architectures whereby the motherboard receptacle can receive either an all electronic (classical) interface or an opto-electronic interface, as discussed above.

The optical engine in the example shown in FIGS. 9 to 11 is typically provided on a flexible laminate material such as flexible polyimide on which the optical engine is housed. This enables the required mechanical detachment of the optical interface from the rigid material that would typically be used to form the PCB on which the electrical connections are formed to be achieved. Where the optical connection is entirely in plane with the electrical connection, i.e. the example of FIGS. 1 to 4, no flexibility is required in the PCB material. However, flexibility is preferred as it is useful to provide give or movement in the connector to allow for the coarser mechanical alignment tolerances of the surrounding electrical connections, i.e. to stop any conflict or "fight" between the electrical connectors and the optical connection.

Although, it will be appreciated that any appropriate material can be used and, if desired, flexibility can indeed be provided.

Embodiments of the present invention have been described with particular reference to the examples illustrated. However, it will be appreciated that variations and modifications may be made to the examples described within the scope of the present invention.

The invention claimed is:

1. An active interconnect for a data storage system comprising:
    an electrical power connection for providing power to a data storage device;
    an electronic data connector providing electrical connectivity to a backplane to which the data storage device is to be connected; and,
    an optical data connector providing optical connectivity to the backplane, the optical data connector comprising an optical engine for generating or receiving optical signals, or both for transmission of data between the optical engine and the backplane, wherein the optical engine is arranged to receive or generate electrical data signals, or both for transmission of data between the optical engine and the data storage device,
    wherein the interconnect is configured to enable data transfer between the data storage device and the backplane, and,
    wherein the interconnect is sized to be received in a socket of a receptacle interconnect fixedly mounted to the backplane.

2. An interconnect according to claim 1, the interconnect being provided as a separate unit for connection to a data storage device or an optical backplane.

3. An interconnect according to claim 1, the optical interconnect being provided as an integrated part of a data storage device.

4. An interconnect according to claim 1, wherein the interconnect is a standard electrical SAS and/or SATA interconnect modified to include high speed optical data connections.

5. An interconnect according to claim 4, in which the footprint of the modified interconnect is substantially the same as the footprint of the standard electrical SAS and/or SATA interconnect.

6. An interconnect according to claim 1, in which the optical engine is provided in parallel with and in a different physical plane from the electrical power connection.

7. An interconnect according to claim 6, including in addition to the optical engine, high speed electrical bidirectional data channels.

8. An interconnect according to claim 6, in which the optical engine is provided on a flexible support layer and a rigid brace is provided to hold the optical engine and the flexible support layer in a fixed orientation with respect to the physical plane of the electrical power connection.

9. An electro optical backplane for use with an interconnect according to claim 1, comprising one or more optical waveguides for carrying optical signals; an electrical power connection for connection to the electrical power connection of the interconnect of claim 1; and an optical interface connection region for engagement with the optical engine of the interconnect of claim 1.

10. An electro optical backplane according to claim 9, in which the electrical power connection and the optical interface connection region in combination have the same footprint as the footprint of a standard electrical SAS and/or SATA interconnect.

11. An electro optical backplane according to claim 9, in which the electrical power connection has a footprint the same as the footprint of a standard electrical SAS and/or SATA interconnect and in which the optical interface connection region is provided adjacent to the electrical power connection.

12. A data storage receptacle interconnect for arrangement on an optical backplane for connection of a data storage device with the backplane, the interconnect comprising:
- a socket fixedly mounted to the backplane and having an opening for receiving a further interconnect, the further interconnect associated with a data storage device and comprising an optical engine;
- the socket comprising:
  - a first region for providing electrical data transfer between the further interconnect and the optical backplane, and
  - a second region comprising an opening to provide access to one or more optical waveguides on the optical backplane to provide high speed optical data connection between the optical engine of the further interconnect and the optical backplane.

13. A data storage interconnect according to claim 12, in which the socket is permanently mounted to the optical backplane.

14. A data storage interconnect according to claim 12, in which the footprint of the interconnect is substantially the same as the footprint of a standard electrical SAS and/or SATA interconnect.

15. A data storage interconnect according to claim 12, in which the second region comprises an interface component for engagement with an optical engine provided on the further interconnect.

16. A data storage interconnect according to claim 12, wherein the footprint of the first region is substantially the same as the footprint of a standard electrical SAS/SATA interconnect and the second region is provided adjacent to the first region to enable parallel optical communication with the backplane.

17. An electro optical backplane for use with an interconnect according to claim 12, comprising
- one or more optical waveguides for carrying optical signals;
- an electrical power connection for connection to the electrical power connection of the interconnect of claim 12; and
- an optical interface connection region for engagement with the optical engine of the interconnect of claim 12.

18. An electro optical backplane according to claim 17, in which the electrical power connection and the optical interface connection region in combination have the same footprint as the footprint of a standard electrical SAS and/or SATA interconnect.

19. An electro optical backplane according to claim 17, in which the electrical power connection has a footprint the same as the footprint of a standard electrical SAS and/or SATA interconnect and in which the optical interface connection region is provided adjacent to the electrical power connection.

* * * * *